United States Patent
Okada

(10) Patent No.: US 7,348,548 B2
(45) Date of Patent: Mar. 25, 2008

(54) IMAGE FORMING APPARATUS AND IMAGE FORMING METHOD

(75) Inventor: Masanori Okada, Osaka (JP)

(73) Assignee: Kyocera Mita Corporation (JP)

( * ) Notice: Subject to any disclaimer, the term of this patent is extended or adjusted under 35 U.S.C. 154(b) by 33 days.

(21) Appl. No.: 11/354,682

(22) Filed: Feb. 15, 2006

(65) Prior Publication Data
US 2006/0180751 A1 Aug. 17, 2006

(30) Foreign Application Priority Data
Feb. 17, 2005 (JP) ............................. 2005-040284

(51) Int. Cl.
- H01J 3/14 (2006.01)
- G02B 7/04 (2006.01)
- G02B 26/08 (2006.01)
- B41J 2/47 (2006.01)
- B41J 2/455 (2006.01)
- B41J 15/14 (2006.01)

(52) U.S. Cl. .................. 250/234; 250/201.5; 250/235; 347/232; 347/233; 347/243; 359/201; 359/213

(58) Field of Classification Search ............... 250/234, 250/559.06, 559.49, 235, 236, 216, 226, 250/201.5; 359/17, 201, 204, 223, 213; 356/3.09, 356/606, 608; 347/233, 243, 247, 232, 260
See application file for complete search history.

(56) References Cited

U.S. PATENT DOCUMENTS

| | | | |
|---|---|---|---|
| 4,992,655 A * | 2/1991 | Shelander | 250/235 |
| 5,245,181 A * | 9/1993 | Cho | 250/236 |
| 2006/0153558 A1* | 7/2006 | Tan et al. | 396/155 |

FOREIGN PATENT DOCUMENTS

JP 9-52387 2/1997

* cited by examiner

*Primary Examiner*—Georgia Epps
*Assistant Examiner*—Don Williams
(74) *Attorney, Agent, or Firm*—Gerald E. Hespos; Anthony J. Casella

(57) ABSTRACT

A printer has a laser emitter for emitting a laser beam to irradiate a surface of a photosensitive member; a reflector, disposed at a position on a laser beam path defined by the laser emitter and the photosensitive member, for reflecting the laser beam emitted by the laser emitter to direct the reflected laser beam to a target position on the surface of the photosensitive member; a reflective mirror driver for reciprocating the reflector in such a manner that the laser beam travels along a scanning line on the surface of the photosensitive member in a direction for scanning; and an emission controller for controlling the laser emitter to selectively emit the laser beam along the scanning line in the forward direction or the backward direction defined by the movement of the reflector driven by the reflective mirror driver.

6 Claims, 4 Drawing Sheets

IMAGE FORMING APPARATUS AND IMAGE FORMING METHOD

BACKGROUND OF THE INVENTION

1. Field of the Invention

The present invention relates to an image forming apparatus for forming an image with use of laser light, and an image forming method for use in the image forming apparatus.

2. Description of the Related Art

Heretofore, there has been generally used a laser scanner equipped with a rotary polygon mirror in an image forming apparatus such as a copier, a printer, or a fax. In the image forming apparatus, there is likelihood that the position of an image to be formed on a recording sheet may be displaced from where the image should be formed in a sub-scanning direction due to an attachment error regarding the position of a laser light source or the like. In such a case, the positional displacement in the sub-scanning direction can be corrected in the unit of scanning line by intentionally shifting an output of laser light by the distance corresponding to an appropriate number of scanning lines in the sub-scanning direction. This approach enables to suppress the positional displacement within ½ of the scanning line interval at maximum. The reason is as follows.

FIG. 5 is an illustration showing a scanning example according to the above approach. The solid line in FIG. 5 is a targeted scanning line i.e. a line representing the absolute position of scanning, and the dashed line in FIG. 5 represents an actual scanning line, with the arrow thereof showing the scanning direction. The actual scanning line 22 is displaced from the targeted scanning line 21 by about ½ of the scanning line interval, which corresponds to the resolution of the sub-scanning direction. In this case, if the contents i.e. image data to be outputted to the scanning line 22 is outputted to the position of a scanning line one line before the actual scanning line 22, a scanning line 23 is scanned. This means the displacement corresponding to about ½ of the scanning line interval is not canceled, and the approach fails to reduce the displacement. If the actual scanning line is displaced from the targeted scanning line by the amount more than ½ of the scanning line interval e.g. ¾ of the scanning line interval, the displacement can be reduced to the amount smaller than ½ of the scanning line interval i.e. ¼ of the scanning line interval by shifting the scanning line one line before the actual scanning line. This approach enables to suppress the displacement within ½ of the scanning line interval.

In the case where the rotation number of the rotary polygon mirror is increased without changing the rotating speed of a photosensitive member, each of the scanning line intervals can be decreased, with the result that the positional displacement is reduced to the amount smaller than ½ of the scanning line interval.

Also, Japanese Unexamined Patent Publication No. 09-52387 recites an image forming apparatus equipped with a galvano mirror in place of a rotary polygon mirror. The image forming apparatus performs image formation by reciprocal scanning with use of the galvano mirror, namely, by causing the galvano mirror to swing back and forth or reciprocate within a certain angular range at a fixed cycle.

In a tandem color image forming apparatus, a positional displacement may occur with at random displacement amounts in the respective colors. This leads to a displacement that relative scanning positions are displaced between the respective colors, which may cause a color displacement due to the displacement of the relative scanning positions between the respective colors.

In the image forming apparatus designed to increase the rotation number of the rotary polygon mirror, a noise may be increased by increasing the rotation number, or the useful life of a motor may be shortened, or use of a costly motor may be needed. Also, if the rotation number of the rotary polygon mirror is increased, a clock for outputting image data may be increased, which may lead to unduly increase of radiation.

Although the image forming apparatus recited in the above publication executes image formation by reciprocal scanning, the publication is silent about a method for correcting the positional displacement or the color displacement.

SUMMARY OF THE INVENTION

In view of the above problems residing in the prior art, it is an object of the present invention to provide an image forming apparatus free from the drawbacks such as increase of a noise, shortened useful life of a motor, required use of a costly motor, or unduly increase of radiation, even if correction precision regarding positional displacement or color displacement is raised.

An aspect of the invention is directed to an image forming apparatus comprising: a laser emitter for emitting a laser beam to irradiate a surface of a photosensitive member; a reflector, disposed at a position on a laser beam path defined by the laser emitter and the photosensitive member, for reflecting the laser beam emitted by the laser emitter to direct the reflected laser beam to the surface of the photosensitive member; a driver for reciprocatively moving the reflector in such a manner that the laser beam travels along a scanning line on the surface of the photosensitive member in a direction for scanning; a setter for selectively setting the scanning line on the surface of the photosensitive member by the emission of the laser emitter between the scanning line in a forward direction and the scanning line in a backward direction defined by the movement of the reflector by the driver, the set scanning line being closer to a position of the targeted scanning line on the surface of the photosensitive member; and an emission controller for controlling the laser emitter to emit the laser beam along the scanning line in the direction set by the setter.

In the above arrangement, the reflector is driven by the driver, and the emission controller controls the laser emitter to emit the laser beam along the scanning line in the direction set by the setter.

With this arrangement, the scanning line closer to the position of the targeted scanning line is selectively used for image scanning between the scanning line in the forward direction and the scanning line in the backward direction. Accordingly, the displacement between the actual scanning line and the targeted scanning line can be reduced to ¼ of the scanning line interval in scanning an image of a certain color. In other words, whereas, in the conventional art, the displacement concerning the scanning position is reduced only to ½ of the scanning line interval or less, the above arrangement enables to reduce the displacement to ¼ of the scanning line interval or less, which is half of the displacement in the conventional art, by making it possible to utilize the scanning line in the backward direction, as well as the scanning line in the forward direction. Thereby, the positional displacement regarding image formation relative to the position where the image is to be recorded, or color displacement can be lessened. Also, this arrangement eliminates a control of increasing the rotation number of a rotary polygon mirror, as implemented in the conventional art. Accordingly, the arrangement is free from the drawbacks such as increase of a noise, shortened useful life of a motor, required use of a costly motor, or unduly increase of irradiation by performing the above correction regarding the positional displacement or the color displacement.

These and other objects, features and advantages of the present invention will become more apparent upon reading of the following detailed description along with the accompanying drawings.

DETAILED DESCRIPTION OF THE PREFERRED EMBODIMENTS

Figure 1:
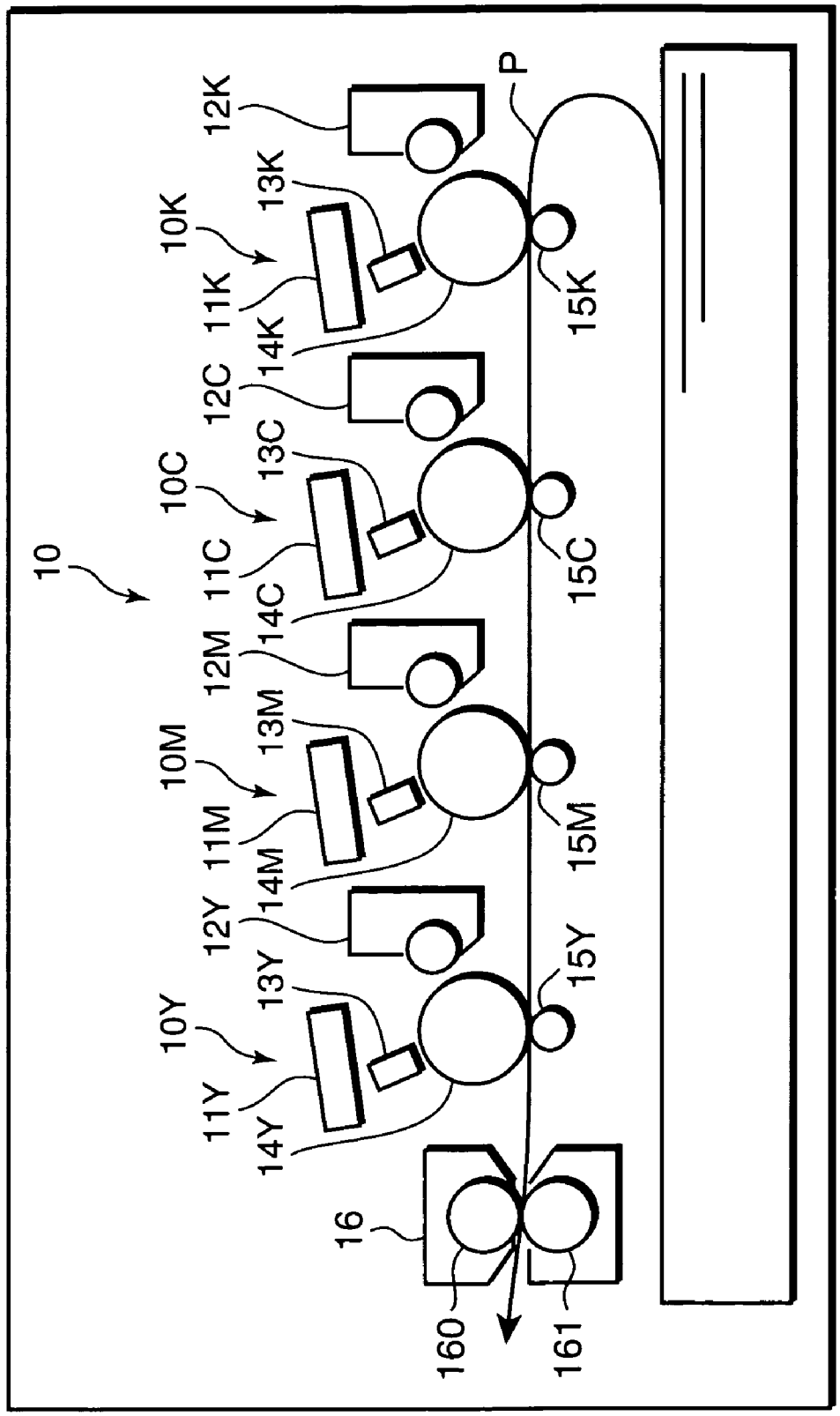
FIG. 1 is a block diagram showing a mechanical construction of an image forming apparatus in accordance with an embodiment of the invention.

In the following, an embodiment of the invention is described referring to the drawings. FIG. 1 is a block diagram showing a mechanical construction of a printer 1 as an example of an image forming apparatus in accordance with an embodiment of the invention. The printer 1 includes an image forming assembly 10, and a fixing unit.16 as mechanical components for image formation.

The image forming assembly 10 has image forming units 10Y, 10M, 10C, and 10K for forming toner images of yellow (Y), magenta (M), cyan (C), and black (K), respectively. Since the image forming units 10Y, 10M, 10C, and 10K have identical constructions to each other, the construction of the image forming unit is described by taking an example of the image forming unit 10K, and description on constructions of the image forming units 10Y, 10M, and 10C will be omitted herein.

The image forming unit 10K has a laser scanner 11K, a developer 12K, a charger 13K, a photosensitive drum 14K, and a transfer roller 15K. The photosensitive drum 14K is a cylindrical member, and is rotated in the clockwise direction in FIG. 1 by receiving a driving force from an unillustrated motor. The charger 13K substantially uniformly charges the surface of the photosensitive drum 14K. The laser scanner 11K is provided with a light source such as a laser diode, and forms an electrostatic latent image corresponding to image data by emitting a light signal in accordance with the image data onto the surface of the photosensitive drum 14K, which is substantially uniformly charged by the charger 13K. Details on the laser scanner 11K will be described later referring to FIG. 2.

The developer 12K has a toner container for accommodating toner of black (K) therein, and forms a toner image of black (K) on the surface of the photosensitive drum 14K by supplying the black toner onto the surface of the photosensitive drum 14K where the electrostatic latent image has been formed. The black toner image formed on the surface of the photosensitive drum 14K is transferred onto a recording sheet or a transfer belt (not shown) transported along a transport path P by the transfer roller 15K, which will be described later.

Four transfer rollers 15Y, 15M, 15C, and 15K are provided at positions opposing to the photosensitive drums 14Y, 14M, 14C, and 14K, respectively. The transfer rollers 15Y, 15M, 15C, and 15K are made of a rubber material or an equivalent material having conductivity to transfer the toner images of the respective colors formed on the surfaces of the photosensitive drums 14Y, 14M, 14C, and 14K onto the recording sheet or the transfer belt transported along the transport path P.

The fixing unit 16 includes a fixing roller 160 equipped with an internal heater or the like, and a pressure roller 161 to fix the toner images on the recording sheet by pressingly transporting the recording sheet carrying the toner images.

Now, an image forming operation with use of the printer 1 is described briefly. First, the surface of the photosensitive drum 14K, serving as an image carrier, is substantially uniformly charged by the charger 13K. Then, the surface of the charged photosensitive drum 14 is exposed by the laser scanner 11K serving as an exposure device to form an electrostatic latent image to be formed on a recording sheet onto the surface of the photosensitive drum 14K. The electrostatic latent image is developed into a toner image by attracting the toner onto the surface of the photosensitive drum 14 by the developer 12K serving as a developing device. The toner image formed on the surface of the photosensitive drum 14K is transferred onto the recording sheet by the transfer roller 15K serving as a transferring device. The above operation is conducted for each of the colors Y, M, C, and K. Thereafter, the toner images of the respective colors which have been successively transferred onto the recoding sheet are fixed on the recording sheet by the fixing unit 16 serving as a fixing device.

Figure 2:
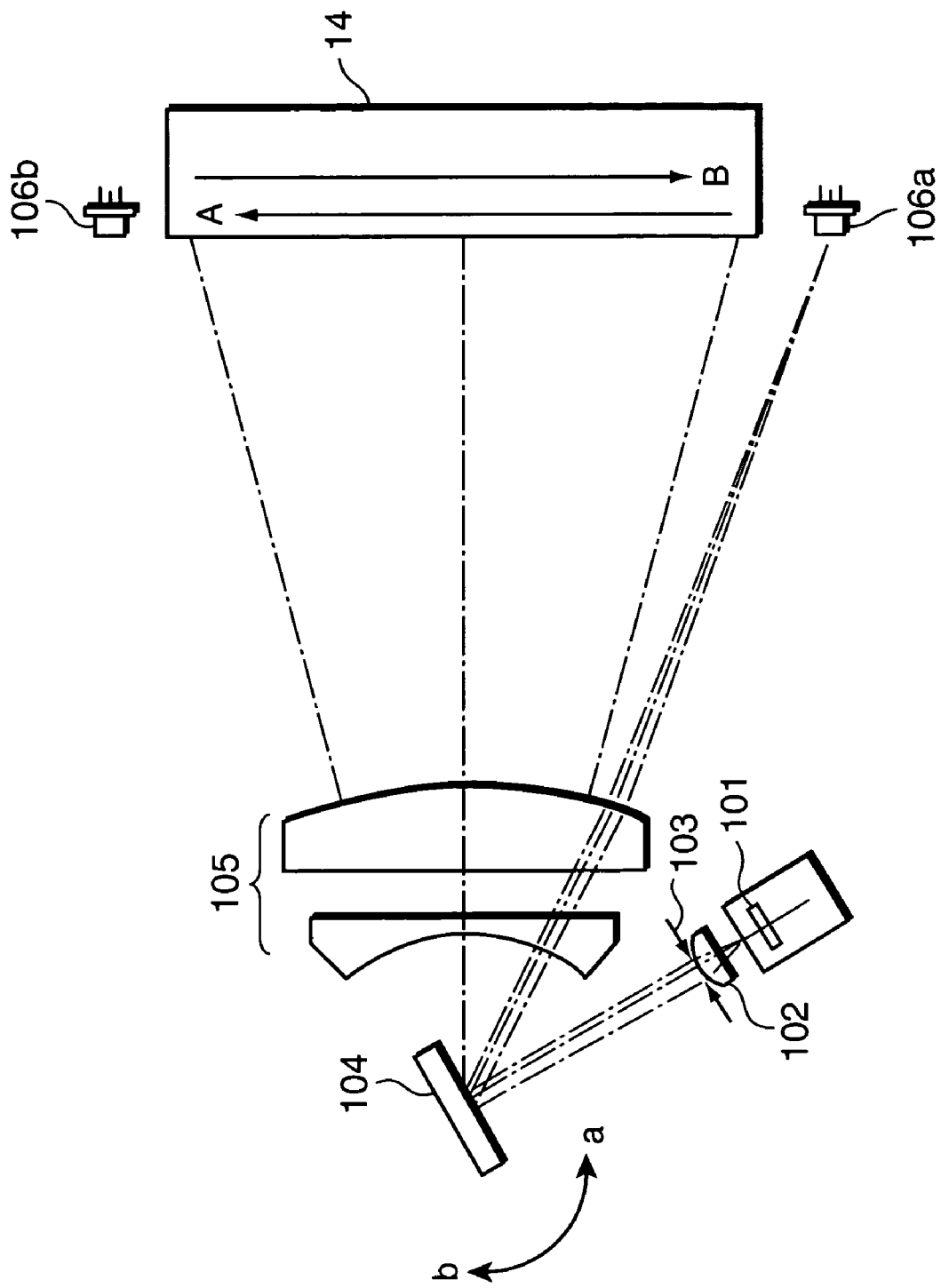
FIG. 2 is a block diagram showing a mechanical construction of a laser scanner equipped in the image forming apparatus shown in FIG. 1.

FIG. 2 is a block diagram showing a mechanical construction of the laser scanner 11K. Since the laser scanners 11Y, 11M, 11C, and 11K have identical constructions to each other, the construction of the laser scanner is described by taking an example of the laser scanner 11K, and description on the constructions of the laser scanners 11Y, 11M, and 11C will be omitted herein. The laser scanner 11K includes a semiconductor laser 101, a collimator lens 102, a diaphragm 103, a reflective mirror 104, a lens group 105, and beam detection (BD) sensors 106a, 106b.

The semiconductor laser 101 generates a laser beam. The collimator lens 102 and the diaphragm 103, in cooperation to each other, collimate the laser beam emitted from the semiconductor laser 101 into substantially parallel beams. The reflective mirror 104 reflects the laser beam generated from the semiconductor laser 101 by swinging back and forth in the directions of arrows a and b to scan the laser beam in the axial direction of the photosensitive drum 14K. Hereinafter, for sake of easy description, the photosensitive drum 14K is simply called as "photosensitive drum 14".

Specifically, in the case where the reflective mirror 104 moves in the direction of the arrow a, the laser beam is scanned in the direction of the arrow A, and in the case where the reflective mirror 104 moves in the direction of the arrow b, the laser beam is scanned in the direction of the arrow B. The lens group 105 is driven for correction so that the laser beam reflected on the reflective mirror 104 is scanned at a constant speed relative to the surface of the photosensitive drum 14.

The beam detection sensor 106a, 106b is a sensor for detecting the laser beam reflected on the reflective mirror 104. A detection signal outputted from the beam detection sensor 106a, 106b is used to synchronize the movement of the reflective mirror 104 and image data writing. The beam detection sensor 106a is used to synchronize the movement of the reflective mirror 104 with image data writing in the direction of the arrow A, and the beam detection sensor 106b is used to synchronize the movement of the reflective mirror 104 with image data writing in the direction of the arrow B.

Figure 3:
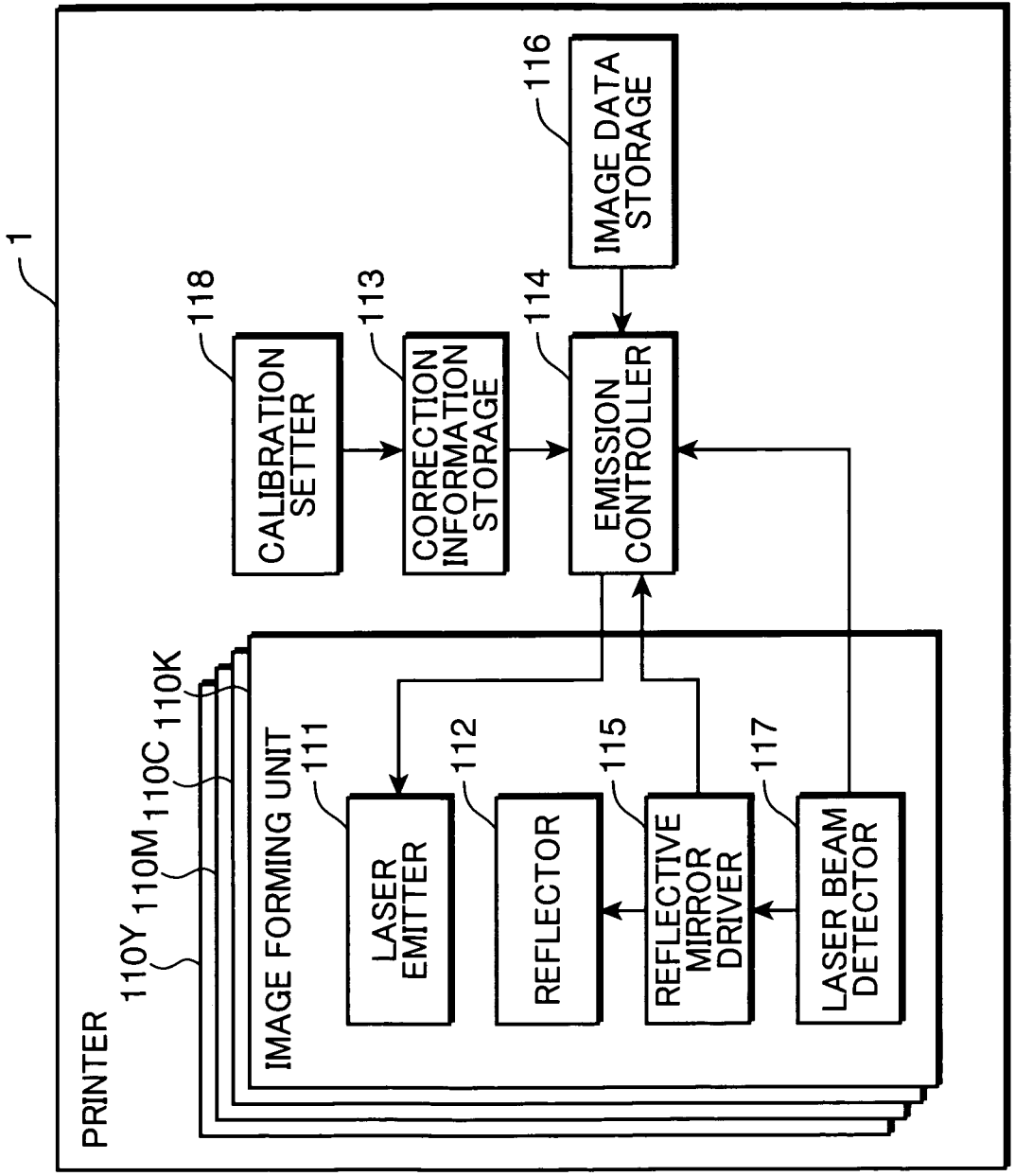
FIG. 3 is a block diagram showing a functional arrangement of the image forming apparatus shown in FIG. 1.

Now, a functional arrangement of the printer 1 in accordance with the embodiment of the invention is described. FIG. 3 is a block diagram showing the functional arrangement of the printer 1 in accordance with the embodiment. The printer 1 functionally includes image forming units 110Y, 110M, 110C, and 110K for forming images of the respective colors, a correction information storage 113, an emission controller 114, an image data storage 116, and a calibration setter 118. The image forming units 110Y, 110M, 110C, and 110K have the arrangements identical to each other. Each of the image forming units 110Y, 110M, 110C, and 110K includes a laser emitter 111, a reflector 112, a reflective mirror driver 115, and a laser beam detector 117.

The laser emitter 111 corresponds to the semiconductor laser 101, and the reflector 112 corresponds to the reflective mirror 104. The laser beam detector 117 corresponds to the beam detection sensors 106a, 106b. In the case where the laser beam detector 117 corresponding to the beam detection sensors 106a, 106b detects a laser beam, the laser beam detector 117 sends a detection signal indicative of the detection to the emission controller 114 and to the reflective mirror driver 115. The image data storage 116 stores therein image data for image formation. The image data storage 116 includes a random access memory (RAM), for instance. The image data stored in the image data storage 116 is data that has been sent from an information processor such as a personal computer (PC) connected to the printer 1, and received by the printer 1.

The correction information storage 113 stores therein information relating to correction of the scanning position of the laser beam on the surface of the photosensitive drum 14. Specifically, the correction information storage 113 stores scanning direction information representing the direction for scanning, i.e., forward direction or backward direction, and displacement information representing displacement between the line to be scanned if no correction is performed and the actual scanning line, by the number of scanning lines. The correction information storage 113 stores the scanning direction information and the displacement information for each of the image forming units 110Y, 110M, 110C, and 110K of forming images of the respective colors of Y, M, C, and K. The correction information storage 113 is e.g. a hard disk drive (HDD).

The calibration setter 118 is operative to perform test printing of printing, for instance, a specific test pattern on a transfer belt or an equivalent member, analyze the test printing result, determine the scanning direction and the scanning line number corresponding to the displacement based on the analysis result on the test printing, and to store the determination result in the correction information storage 113. The calibration setter 118 may be designed in such a manner that the scanning direction information and the displacement information to be stored in the correction information storage 113 may be manually designated by the user.

In the embodiment, the calibration setter 118 is provided in the printer 1. Alternatively, the user may designate the scanning direction and the scanning line number corresponding to the displacement with use of the PC connected to the printer 1, and the designation result by the user may be stored in the correction information storage 113 through the PC. Further alternatively, the manufacturer of the printer 1 may store the scanning direction information and the displacement information at the time of production of the printer. In the case where the user or the manufacturer determines the scanning direction and the scanning line number corresponding to the displacement, the user or the manufacturer performs test printing of printing, for instance, a specific test pattern on a recording sheet or the like, judges a displacement degree of the printed position in the sub-scanning direction based on the test printing result, and determines the scanning direction and the scanning line number corresponding to the displacement.

The reflective mirror driver 115 causes the reflector 112 corresponding to the reflective mirror 104 to reciprocate, with use of a motor serving as a drive source, for example. The reflective mirror driver 115 changes the moving direction of the reflective mirror 104 in a direction opposite to the moving direction thereof in response to receiving a detection signal from the laser beam detector 117.

The emission controller 114 controls the laser emitter 111 of each of the image forming units 110Y, 110M, 110C, and 110Y to emit a laser beam corresponding to image data, based on the image data stored in the image data storage 116. The emission controller 114 controls each of the laser emitters 111 in such a manner that the scanning direction, namely, the forward direction or the backward direction, and the scanning line number corresponding to the displacement are read out from the correction information storage 113 for each of the colors of Y, M, C, and K, and that a laser beam is emitted from the corresponding laser emitter 111 by displacing the actual scanning line from the line to be scanned by the readout scanning line number in the readout scanning direction. The emission controller 114 executes the above control operation synchronously with the writing operation of the respective scanning lines based on the detection signal outputted from the laser beam detector 117.

Figure 4:
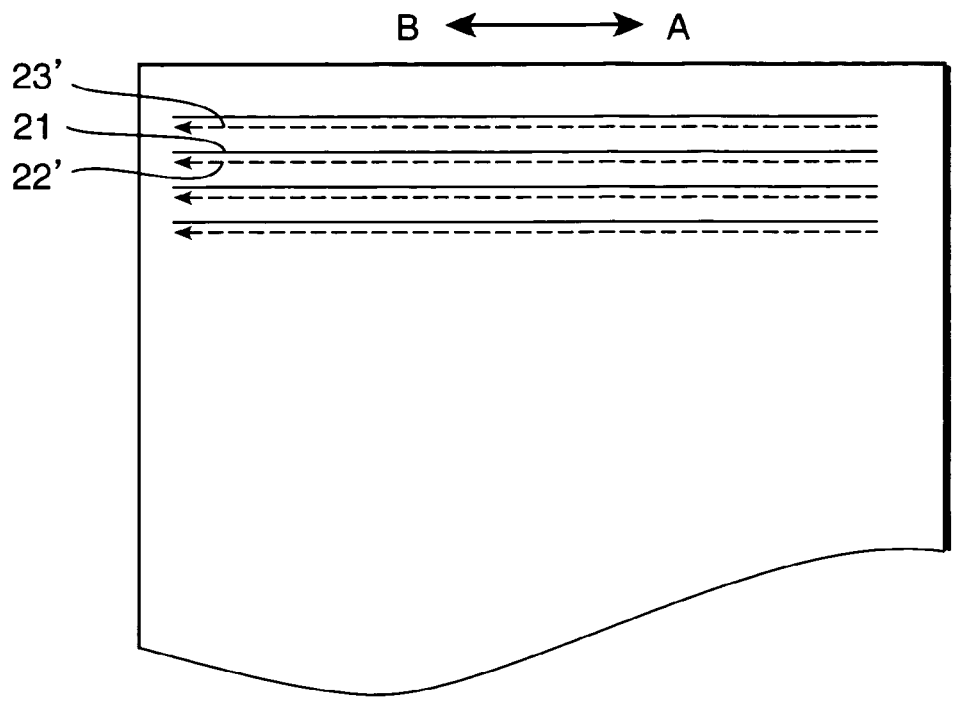
FIG. 4 is an illustration showing a concept on scanning of lines on a recording sheet in the embodiment of the invention.
Figure 5:
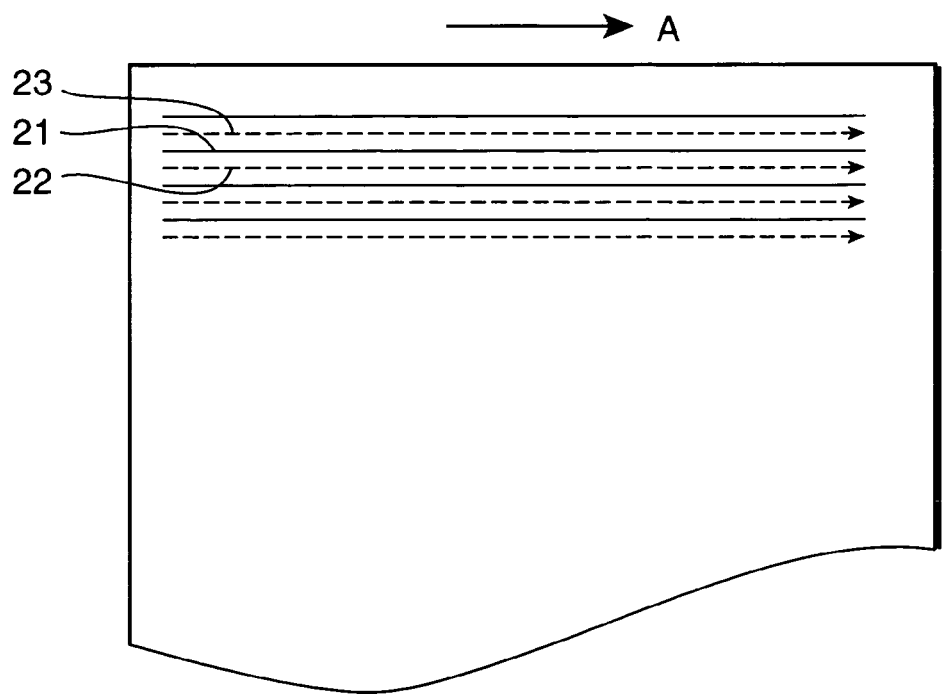
FIG. 5 is an illustration showing a concept on scanning lines on a recording sheet in the conventional art.

FIG. 4 is an illustration showing an example to which the embodiment of the invention is applied, in the case where there is a positional displacement between the targeted scanning line and the actual scanning line by about ½ of the scanning line interval in the conventional example shown in FIG. 5. In the example of FIG. 4, the dashed line with the arrow represents an actual scanning line. In this example, a scanning line in the backward direction with an interval of half of the scanning line interval between the scanning lines in the forward direction is used. Accordingly, the displacement of the actual scanning line 21' relative to the targeted scanning line 21 is about ¼ of the scanning line interval, which is half of the displacement in the conventional art i.e. ½ of the scanning line interval.

In the embodiment, the reciprocating reflective mirror is provided in place of a rotary polygon mirror, and laser beam emission is enabled in the forward direction and in the backward direction. Thereby, scanning for image data writing is performed by using the scanning line in the forward direction or the scanning line in the backward direction, which has a smaller color displacement, and scanning in the backward direction, which is displaced relative to the scanning in the forward direction by ½ of the scanning line interval is executed. This arrangement enables to reduce the displacement between the actual scanning line and the targeted scanning line to ¼ of the scanning line interval or less in scanning an image of a certain color, which is half as large as the displacement in the conventional arrangement. This means, in case of the color image forming apparatus for forming an image with use of plural colors, as described in the embodiment, displacement on the absolute position of scanning the respective color image components on a recording sheet in the sub-scanning direction can be reduced to ¼ of the scanning line interval or less. This also means that the positional displacement i.e. color displacement on the respective color image components in the sub-scanning direction can be reduced to ¼ of the scanning line interval or less.

The invention is not limited to the foregoing embodiment, but is applicable to the following modifications. In the embodiment, the invention is applied to the tandem color image forming apparatus, in which displacement of the actual scanning line relative to the targeted scanning line i.e. the absolute position of scanning is corrected for each of the color image forming units. The invention is not only applied to the tandem color image forming apparatus, but also is applied to a monochromatic image forming apparatus equipped with a single image forming unit. In the modification, namely, in the monochromatic image forming apparatus, displacement on the absolute position of scanning an image to be recorded on a recording sheet in the sub-scanning direction can reduced to ¼ of the scanning line interval or less. This enables to accurately form the image at the intended position on the recording sheet.

In the embodiment, the positional displacement and the color displacement are corrected by correcting the absolute position of the scanning lines of the respective colors. Alternatively, the color displacement may be corrected by, for instance, correcting the relative positional displacement of the scanning lines of the respective colors. In the modification, a calibration setter may set the scanning line for image formation of the color other than a target color in the forward direction or in the backward direction, which is closer to the position of the scanning line for image formation of the target color, as a scanning line to be actually scanned.

Also, in the embodiment, the image forming apparatus is provided with one semiconductor laser for each of the colors. Alternatively, the invention is applicable to an image forming apparatus equipped with plural semiconductor lasers for each of the colors or a monochromatic color, so that the apparatus is capable of outputting plural scanning lines concurrently.

In the modification, the method for correcting the plural scanning lines that are scanned concurrently for a certain color is the same as the method for scanning a single scanning line, as described in the embodiment. Specifically, in the modification, a calibration setter may be operative to conduct a test printing of printing, for example, a specific test pattern on a transfer belt or an equivalent member, analyze the test printing result, and determine the scanning direction and the scanning line number corresponding to the displacement for each of the scanning lines that are concurrently scanned by the corresponding semiconductor laser for storage into a correction information storage. Then, an emission controller is operative to read out the scanning direction, namely, the forward direction or the backward direction, and the scanning line number corresponding to the displacement from the correction information storage for each of the scanning lines that are concurrently irradiated by the corresponding semiconductor laser. Subsequently, the emission controller is operative to control the corresponding laser emitter provided opposing to the counterpart photosensitive member to emitter a laser beam to a scanning line which is displaced from the targeted scanning line by the readout scanning line number in the readout scanning direction, for each of the scanning lines that are concurrently irradiated by the corresponding semiconductor laser. This arrangement enables to perform positional displacement correction or color displacement correction more precisely in the image forming apparatus having an increased scanning speed.

In the embodiment, the printer has been described as an example of the image forming apparatus. The image forming apparatus of the invention may be a copier, a fax, or a complex machine having functions of a copier and a fax, for instance. In the modification, image data for forming an image may be the one that has been read out from a document image by a document reader (not shown) provided in the image forming apparatus, or the one that has been sent from a fax transmitter connected to the image forming apparatus, and has been received by the image forming apparatus.

To summarize the invention, the invention is directed to an image forming apparatus comprising: a laser emitter for emitting a laser beam to irradiate a surface of a photosensitive member; a reflector, disposed at a position on a laser beam path defined by the laser emitter and the photosensitive member, for reflecting the laser beam emitted by the laser emitter to direct the reflected laser beam to the surface of the photosensitive member; a driver for reciprocatively moving the reflector in such a manner that the laser beam travels along a scanning line on the surface of the photosensitive member in a direction for scanning; a setter for selectively setting the scanning line on the surface of the photosensitive member by the emission of the laser emitter between the scanning line in a forward direction and the scanning line in a backward direction defined by the movement of the reflector by the driver, the set scanning line being closer to a position of the targeted scanning line on the surface of the photosensitive member; and an emission controller for controlling the laser emitter to emit the laser beam along the scanning line in the direction set by the setter.

Also, the invention is directed to a method for forming an image with use of an image forming apparatus designed in such a manner that scanning for image data writing is performed in a forward direction and in a backward direction by reciprocating a laser beam to be emitted. The method comprises the steps of: selectively setting a scanning line for the image data writing by the emission of the laser beam between the scanning line in the forward direction and the scanning line in the backward direction, a position of the set scanning line being closer to the targeted scanning line; and emitting the laser beam to a surface of a photosensitive member of the image forming apparatus along the scanning line in the direction set in the setting step, the laser beam being a light signal obtained by conversion of image data.

With the above arrangements, the scanning line closer to the position of the targeted scanning line is selectively used for image scanning between the scanning line in the forward direction and the scanning line in the backward direction. Accordingly, the displacement between the actual scanning line and the targeted scanning line can be reduced to ¼ of the scanning line interval in scanning an image of a certain color. In other words, whereas, in the conventional art, the displacement concerning the scanning position is reduced only to ½ of the scanning line interval or less, the above arrangement enables to reduce the displacement to ¼ of the scanning line interval or less, which is half of the displacement in the conventional art, by making it possible to utilize the scanning line in the backward direction, as well as the scanning line in the forward direction. Thereby, the positional displacement regarding image formation relative to the position where the image is to be recorded, or color displacement can be lessened. Also, this arrangement eliminates a control of increasing the rotation number of a rotary polygon mirror, as implemented in the conventional art. Accordingly, the arrangement is free from the drawbacks such as increase of a noise, shortened useful life of a motor, required use of a costly motor, or unduly increase of irradiation by performing the above correction regarding the positional displacement or the color displacement.

The invention is also directed to an image forming apparatus comprising: an image forming unit including: a laser emitter for emitting a laser beam to irradiate a surface of a photosensitive member; a reflector, disposed at a position on a laser beam path defined by the laser emitter and the photosensitive member, for reflecting the laser beam emitted by the laser emitter to direct the reflected laser beam to the surface of the photosensitive member; and a driver for reciprocatively moving the reflector in such a manner that the laser beam travels along a scanning line on the surface of the photosensitive member in a direction for scanning, the image forming unit being provided by the number corresponding to the number of basic colors used by the image forming apparatus. The image forming apparatus further comprises: a second setter for selectively setting the scanning line on the surface of the photosensitive member by the emission of the laser emitter for each one of the image forming units, under a condition that the scanning line for image formation of the one of the basic colors is superimposed over the scanning line for image formation of the other one of the basic colors, between the scanning line in a forward direction and the scanning line in a backward direction defined by the movement of the reflector by the driver, the set scanning line being closer to a position of the targeted scanning line for image formation of the other one of the basic colors on the surface of the photosensitive member; and a second emission controller for controlling the laser emitter of the each one of the image forming units to emit the laser beam along the scanning line in the direction set by the second setter.

The invention is further directed to a method for forming an image with use of an image forming apparatus designed in such a manner that scanning for image data writing is performed in a forward direction and in a backward direction by reciprocating a laser beam to be emitted to form an image with use of a plurality of basic colors. The method comprises the steps of: selectively setting a scanning line for image formation of the each one of the basic colors by the emission of the laser beam, under a condition that the scanning line for image formation of the one of the basic colors is superimposed over the scanning line for image formation of the other one of the basic colors, between the scanning line in the forward direction and the scanning line in the backward direction, a position of the set scanning line being closer to the targeted scanning line for image formation of the other one of the basic colors; and emitting the laser beam to a surface of a photosensitive member of the image forming apparatus along the scanning line in the direction set in the setting step, the laser beam being a light signal obtained by conversion of image data.

With the above arrangements, since the scanning line closer to the position of the scanning line for image formation of the other one of the basic colors is selected between the scanning line in the forward direction or in the backward direction for image scanning. Accordingly, the displacement between the scanning lines for image formation of the respective colors can be reduced to ¼ of the scanning line interval for each of the colors. The arrangement enables to reduce color displacement in image formation. Also, the arrangement enables to eliminate drawbacks such as increase of a noise, shortening of the useful life of a motor, required use of a costly motor, or unduly increase of radiation by executing the above correction.

This application is based on Japanese Patent Application No. 2005-40284 filed on Feb. 17, 2005, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. An image forming apparatus comprising:
a laser emitter for emitting a laser beam to irradiate a surface of a photosensitive member;
a reflector, disposed at a position on a laser beam path defined by the laser emitter and the photosensitive member, for reflecting the laser beam emitted by the laser emitter to direct the reflected laser beam to the surface of the photosensitive member;
a driver for reciprocatively moving the reflector in such a manner that the laser beam travels along a scanning line on the surface of the photosensitive member in a direction for scanning;
a setter that uses the reflected laser beam moved by the driver for determining which of a scanning line in a forward direction and a scanning line in a backward direction is closer to a targeted scanning line on the surface of the photosensitive member, the setter further being operative for setting the closer scanning line as the scanning line on the surface of the photosensitive member during an image forming processing; and
an emission controller for controlling the laser emitter to emit the laser beam along the scanning line in the direction set by the setter during the image forming processing.

2. The image forming apparatus according to claim 1, wherein
the laser emitter includes a plurality of laser light sources,
the setter selectively sets the scanning line on the surface of the photosensitive member by the emission of the each one of the laser light sources between the scanning line in the forward direction and the scanning line in the backward direction defined by the movement of the reflector by the driver, the set scanning line being closer to the position of the targeted scanning line on the surface of the photosensitive member, and
the emission controller controls the each one of the laser light sources to emit the laser beam along the scanning line in the direction set by the setter.

3. An image forming apparatus comprising:
an image forming unit including:
a laser emitter for emitting a laser beam to irradiate a surface of a photosensitive member;
a reflector, disposed at a position on a laser beam path defined by the laser emitter and the photosensitive member, for reflecting the laser beam emitted by the laser emitter to direct the reflected laser beam to the surface of the photosensitive member; and a driver for reciprocatively moving the reflector in such a manner that the laser beam travels along a scanning line on the surface of the photosensitive member in a direction for scanning, the image forming unit being provided by the number corresponding to the number of basic colors used by the image forming apparatus, the image forming apparatus further comprising:

a setter that uses the reflected laser beam moved by the driver for determining which of a scanning line in a forward direction or a scanning line in a backward direction is closer to a position of the scanning line of a basic color, under a condition that the scanning line for image formation of one of the basic colors is superimposed over the scanning line for image formation of another one of the basic colors, the setter further being operative for setting the determined scanning line as the scanning line on the photosensitive member for an image forming processing; and an emission controller for controlling the laser emitter of the each one of the image forming units to emit the laser beam along the scanning line in the direction set by the setter for the number of the image forming units.

4. The image forming apparatus according to claim 3, wherein the laser emitter includes a plurality of laser light sources, the setter selectively sets the scanning line on the surface of the photosensitive member by the emission of each one of the laser light sources between the scanning line in the forward direction and the scanning line in the backward direction defined by the movement of the reflector by the driver, the set scanning line being closer to the position of the targeted scanning line on the surface of the photosensitive member, and the emission controller controls the each one of the laser light sources to emit the laser beam along the scanning line in the direction set by the setter.

5. A method for forming an image with use of an image forming apparatus designed in such a manner that scanning for image data writing is performed in a forward direction and in a backward direction by reciprocating a laser beam to be emitted, the method comprising the steps of:

determining which of a scanning line in a forward direction and a scanning line in a backward direction is the scanning line closer to a targeted position of the scanning line when emitting the laser beam, setting the determined scanning line as the scanning line during an image formation; and emitting the laser beam to a surface of a photosensitive member of the image forming apparatus along the scanning line in the direction set in the setting step, the laser beam being a light signal obtained by conversion of image data.

6. A method for forming an image with use of an image forming apparatus designed in such a manner that scanning for image data writing is performed in a forward direction and in a backward direction by reciprocating a laser beam to be emitted to form an image with use of a plurality of basic colors, the method comprising the steps of:

defining a scanning line for image formation of each one of the basic colors by the emission of the laser beam, under a condition that the scanning line for image formation of one of the basic colors is superimposed over the scanning line for image formation another one of the basic colors, the step of defining the scanning line being carried out by determining which of the scanning line in the forward direction and the scanning line in the backward direction, is closer to the targeted scanning line for image formation of the other one of the basic colors, and setting the determined scanning line as the scanning line of the each color during an image formation; and emitting the laser beam to a surface of a photosensitive member of the image forming apparatus along the scanning line in the direction set in the setting step, the laser beam being a light signal obtained by conversion of image data.

* * * * *